(12) United States Patent
Konno

(10) Patent No.: US 11,646,904 B2
(45) Date of Patent: May 9, 2023

(54) INFORMATION PROCESSING APPARATUS AND SERVICE COST CALCULATION METHOD

(71) Applicant: FUJITSU LIMITED, Kawasaki (JP)

(72) Inventor: Kazuya Konno, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/088,198

(22) Filed: Nov. 3, 2020

(65) Prior Publication Data

US 2021/0194710 A1   Jun. 24, 2021

(30) Foreign Application Priority Data

Dec. 20, 2019 (JP) .............................. JP2019-230289

(51) Int. Cl.
| | | |
|---|---|---|
| G06F 15/16 | (2006.01) | |
| H04L 12/14 | (2006.01) | |
| G06Q 50/10 | (2012.01) | |
| H04L 41/22 | (2022.01) | |
| H04L 67/51 | (2022.01) | |

(52) U.S. Cl.
CPC ......... *H04L 12/1435* (2013.01); *G06Q 50/10* (2013.01); *H04L 12/141* (2013.01); *H04L 41/22* (2013.01); *H04L 67/51* (2022.05)

(58) Field of Classification Search
CPC ...... G06Q 10/06; G06Q 20/145; G06Q 50/10; H04L 12/141; H04L 12/1435; H04L 41/22; H04L 67/16
See application file for complete search history.

(56) References Cited

U.S. PATENT DOCUMENTS

| | | | |
|---|---|---|---|
| 10,983,759 B1* | 4/2021 | Kumar | G06F 9/54 |
| 2011/0270963 A1* | 11/2011 | Saito | G06F 11/302 |
| | | | 709/224 |
| 2016/0225042 A1* | 8/2016 | Tran | G06Q 30/0283 |
| 2019/0349210 A1 | 11/2019 | Nayak et al. | |
| 2020/0380478 A1* | 12/2020 | Omori | G07G 1/0009 |

FOREIGN PATENT DOCUMENTS

| | | |
|---|---|---|
| CN | 107707368 A | 2/2018 |
| CN | 110135892 A | 8/2019 |
| WO | WO 2011/018827 A1 | 2/2011 |
| WO | WO 2014/024251 A1 | 2/2014 |
| WO | WO 2016/107510 A1 | 7/2016 |
| WO | WO 2019/102814 A1 | 5/2019 |

OTHER PUBLICATIONS

Extended European Search Report dated Mar. 2, 2021, in corresponding European Patent Application No. 20204763.5.
Official Communication from European Patent Office in European Application No. 20 204 763.5 dated Jul. 22, 2021.

* cited by examiner

*Primary Examiner* — Normin Abedin
(74) *Attorney, Agent, or Firm* — Staas & Halsey LLP

(57) ABSTRACT

An information processing apparatus includes: a memory; and a processor coupled to the memory and the processor configured to: acquire charge system information indicating a charge system of each application programming interface (API) called by a service; acquire usage history information indicating a usage history of the service by a user; and calculate a cost for each API based on a number of calls of each API, which is included in the usage history information, and a charge system of each API.

9 Claims, 12 Drawing Sheets

FIG. 4

| API NAME | CHARGE SYSTEM | DEVELOPMENT COST |
|---|---|---|
| API1 | O YEN PER CALL<br>100 CALLS OR MORE/MONTH, UNIFORM X YEN | ×× YEN |
| API2 | ×O YEN/MONTU | OO YEN |
| API3 | ... | ... |
| API4 | ... | ... |

| SERVICE NAME | NUMBER OF USERS |
|---|---|
| A | 500 |
| B | 1000 |

232

| MODULE NAME | NUMBER OF USERS |
|---|---|
| x | 100 |
| y | 500 |
| z | 1000 |

233

| API NAME | NUMBER OF CALLS |
|---|---|
| API1 | 150 |
| API2 | 120 |
| API3 | 150 |
| API4 | 200 |

FIG. 6

| SERVICE NAME | USAGE FEE |
|---|---|
| A | ○○ YEN |
| B | ×× YEN |

INFORMATION PROCESSING APPARATUS AND SERVICE COST CALCULATION METHOD

CROSS-REFERENCE TO RELATED APPLICATION

This application is based upon and claims the benefit of the prior Japanese Patent Application No. 2019-230289 filed on Dec. 20, 2019, the entire contents of which are incorporated herein by reference.

FIELD

The embodiments discussed herein are related to an information processing apparatus and a service cost calculation method.

BACKGROUND

Computer services using cloud computing have recently been provided by various service providers. It is also known that computer services use a plurality of application programming interfaces (APIs).

Related technologies are disclosed in, for example, International Publication Pamphlet No. WO 2014/024251.

SUMMARY

According to an aspect of the embodiments, an information processing apparatus includes: a memory; and a processor coupled to the memory and the processor configured to: acquire charge system information indicating a charge system of each application programming interface (API) called by a service; acquire usage history information indicating a usage history of the service by a user; and calculate a cost for each API based on a number of calls of each API, which is included in the usage history information, and a charge system of each API.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a charge system storage unit;

FIG. 5 is a diagram illustrating an example of a usage history storage unit;

FIG. 6 is a diagram illustrating an example of a service usage fee storage unit;

DESCRIPTION OF EMBODIMENTS

There are various API charge systems, and it is difficult to grasp the cost of each API required to provide computer services. For this reason, it is also difficult to grasp the profit obtained by providing the services in the related art.

Figure 1:
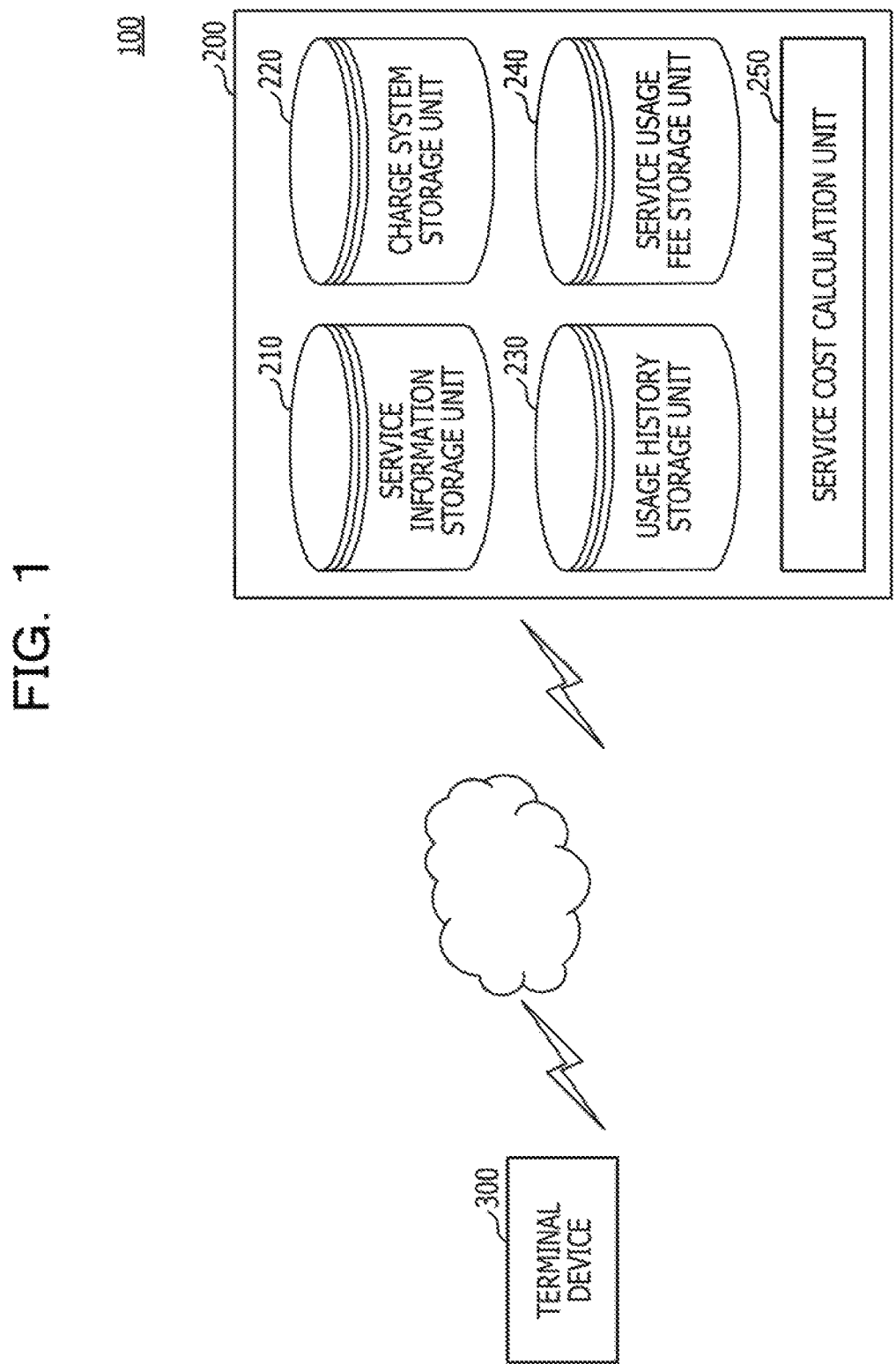
FIG. 1 is a diagram illustrating an example of a system configuration of a service cost calculation system.

Embodiments will be described below with reference to the accompanying drawings. FIG. 1 is a diagram illustrating an example of a system configuration of a service cost calculation system.

A service cost calculation system 100 of the present embodiment includes a service cost calculation device 200 and a terminal device 300, both of which communicate with each other via a network or the like.

In the service cost calculation system 100 of the present embodiment, the service cost calculation device 200 refers to service information regarding a computer service. Then, the service cost calculation system 100 calculates the prospect of profit obtained by providing the computer service and presents the prospect to a computer service provider.

The service information regarding the computer service includes, for example, information indicating a module that implements various functions required to provide the computer service and information indicating an application programming interface (API) that may be used in the computer service.

Meanwhile, the API makes a program created for a certain purpose available to other software.

Further, the API used in the computer service may also be said to be an API called by the computer service. In other words, the API used in the computer service may also be said to be an API which is called by a module required to provide the computer service.

Also, the API that may be used in the computer service may be said to be a candidate for the API called by the computer service.

The terminal device 300 is used, for example, by a computer service provider or the like. The computer service provider is, for example, a business operator who develops and provides a computer service. In the present embodiment, the terminal device 300 displays, for example, the prospect of profit obtained by providing the computer service.

The service cost calculation device 200 of the present embodiment includes a service information storage unit 210, a charge system storage unit 220, a usage history storage unit 230, a service usage fee storage unit 240, and a service cost calculation unit 250.

The service information storage unit 210 stores service information regarding computer services for each computer service provider. In the following description, the computer service may be simply referred to as a service. Further, in the following description, a computer service provider may be referred to as a service provider.

The charge system storage unit 220 stores charge system information indicating a charge system of each API called by a service. The usage history storage unit 230 stores usage history information indicating a history of service usage by a user. The service usage fee storage unit 240 stores usage fee information indicating service usage fees. Details of each of these storage units will be described later.

The service cost calculation unit 250 refers to the service information storage unit 210, the charge system storage unit 220, and the usage history storage unit 230 to calculate the cost for each API called by a module. Then, the service cost calculation unit 250 refers to the service usage fee storage unit 240, calculates the profit obtained by providing the service for each service provider based on the service usage fee and the cost for each API, and outputs the profit to the terminal device 300.

At this time, in the present embodiment, a graph in which graphics representing each service and each API called by each service are arranged at positions corresponding to the number of users and the number of calls, is displayed on two axes of the number of users of the service (the number of users of the service) and the number of calls of the API. Then, in the present embodiment, the profit obtained by providing the service is displayed on the graph in association with the graphic representing the service.

Therefore, according to the present embodiment, it is possible to easily grasp the profit obtained by providing the service using the API.

Meanwhile, in the example of FIG. 1, the service information storage unit 210, the charge system storage unit 220, the usage history storage unit 230, and the service usage fee storage unit 240 are provided in the service cost calculation device 200, but the present disclosure is not limited thereto. A part or all of these storage units may be provided in a device external to the service cost calculation device 200.

Further, in the service cost calculation system 100, the service cost calculation device 200 may be implemented by a plurality of information processing devices.

In addition, in the example of FIG. 1, the service cost calculation system 100 includes one terminal device 300, but the number of terminal devices 300 included in the service cost calculation system 100 may be arbitrary.

Figure 2:
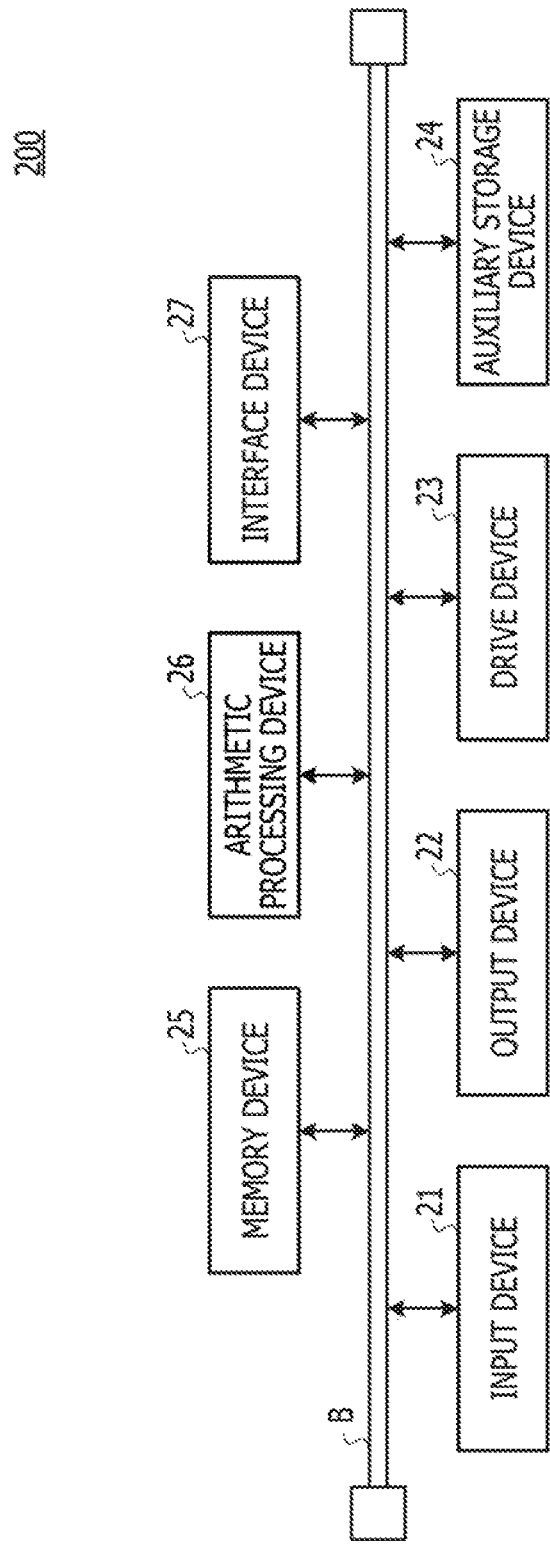
FIG. 2 is a diagram illustrating an example of a hardware configuration of a service cost calculation device.

The service cost calculation device 200 will be described below. FIG. 2 is a diagram illustrating an example of the hardware configuration of the service cost calculation device.

The service cost calculation device 200 of the present embodiment is a computer (information processing apparatus) that includes an input device 21, an output device 22, a drive device 23, an auxiliary storage device 24, a memory device 25, an arithmetic processing device 26, and an interface device 27, which are connected to each other by a bus B.

The input device 21 is a device for inputting various types of information, and is implemented by, for example, a keyboard or a pointing device. The output device 22 is a device for outputting various types of information, and is implemented by, for example, a display. The interface device 27 includes a LAN card and is used to connect to a network.

The service cost calculation program that implements the service cost calculation unit 250 is at least a part of various programs that control the service cost calculation device 200. The service cost calculation program is provided, for example, by distributing a storage medium 28 or downloading from the network. The storage medium 28 on which the service cost calculation program is recorded may use various types of storage media such as a storage medium that records information optically, electrically, or magnetically, such as a CD-ROM, a flexible disk, or a magneto-optical disk, respectively, and a semiconductor memory that records information electrically, such as a ROM or a flash memory.

When the storage medium 28 on which the service cost calculation program is recorded is set in the drive device 23, the service cost calculation program is installed in the auxiliary storage device 24 from the storage medium 28 via the drive device 23. The service cost calculation program downloaded from the network is installed in the auxiliary storage device 24 via the interface device 27.

The auxiliary storage device 24 implements the service information storage unit 210, the charge system storage unit 220, the usage history storage unit 230, the service usage fee storage unit 240, etc. included in the service cost calculation device 200. The auxiliary storage device 24 stores the service cost calculation program installed in the service cost calculation device 200, and also stores various files, data, etc. necessary by the service cost calculation device 200. The memory device 25 reads and stores the service cost calculation program from the auxiliary storage device 24 when the service cost calculation device 200 is activated. Then, the arithmetic processing unit 26 implements various processes described later according to the service cost calculation program stored in the memory device 25.

Next, each storage unit included in the service cost calculation device 200 will be described with reference to FIGS. 3 to 6.

Figure 3:
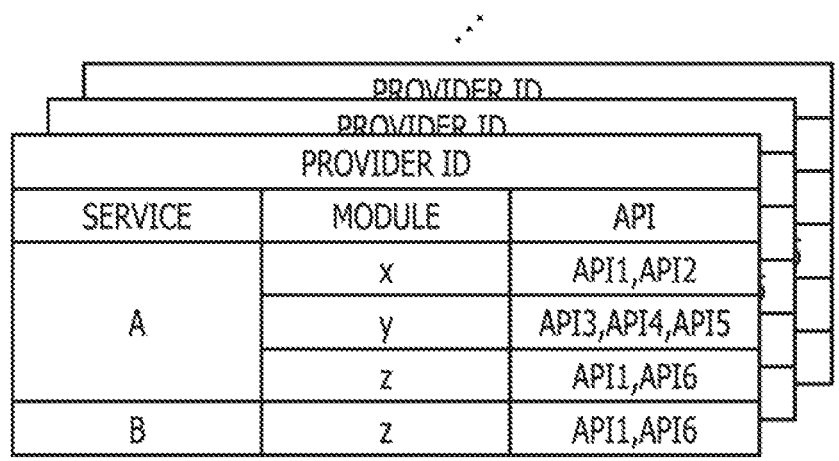
FIG. 3 is a diagram illustrating an example of a service information storage unit.

FIG. 3 is a diagram illustrating an example of the service information storage unit. The service information storage unit 210 of the present embodiment stores, for example, service information for each service provider. Meanwhile, the service information storage unit 210 may be provided in advance by the service provider and registered in the service cost calculation device 200.

The service information stored in the service information storage unit 210 includes a service name, a module name, and an API name as information items. The service information also includes a provider ID that is information identifying the service provider.

In the service information storage unit 210, the provider ID is associated with the items "service name," "module name," and "API name," and the information including the provider ID and the respective values of the items "service name," "module name," and "API name" is the service information.

The value of the item "service name" indicates the name of the service which is provided by the service provider identified by the provider ID.

The value of the item "module name" indicates the name of a module that implements various functions required to provide a computer service. It may be said that the module of the present embodiment is a functional service that provides various functions for providing a computer service. Therefore, a module is a type of computer service.

The value of the item "API name" indicates the name of the API that is a candidate to be called by the module. In other words, the value of the item "API name" indicates the name of the API that may be called by the functional service that is a type of computer service.

In the example of FIG. 3, it may be seen that the service provider identified by the provider ID "01" provides the service having the name "A," and the service having the name "A" includes three modules having module names "x," "y," and "z."

Further, in the example of FIG. 3, the module having the module name "x" may call any one of the APIs having the API names "API1" and "API2." That is, the APIs having the API names "API1" and "API2" indicate API candidates used in the module having the module name "x."

In the example of FIG. 3, the module having the module name "y" may call any of the API names "API2," "API3," and "API4." That is, the APIs having the API names "API2,"

"API3," and "API4" indicate API candidates used in the module having the module name "y."

Further, in the present embodiment, the modules may be shared by different services, and the APIs may be shared by different modules.

In the example of FIG. 3, the service having the name "A" and the service having the name "B" share the module having the name "z."

Further, in the example of FIG. 3, the module having the name "x" and the module having the name "z" share the API having the name "API1."

Also, in the service information storage unit 210 of the present embodiment, each service and each module may be stored in association with an expected number of users. In addition, the service information storage unit 210 may store the expected number of calls in association with each API.

In the following description, the service having the name "A" may be referred to as the A service, and the service having the name "B" may be referred to as the B service. Further, in the following description, the module having the name "x" may be referred to as the x module, the module having the name "y" may be referred to as the y module, and the module having the name "z" may be referred to as the z module. Also, in the following description, APIs having the API names "API2," "API3," and "API4" may be referred to as API1, API2, API3, and API4.

FIG. 4 is a diagram illustrating an example of the charge system storage unit. The charge system storage unit 220 may be provided in the service cost calculation device 200 in advance. Further, the charge system information stored in the charge system storage unit 220 may be collected by the service cost calculation device 200, for example, via the Internet or the like.

The charge system information stored in the charge system storage unit 220 includes, as information items, an API name, a charge system, and a development cost, and is associated with the item "API name" and other items. In the present embodiment, the information including the value of the item "API name" and the values of other items is the charge system information.

The value of the item "charge system" indicates how to charge for the use of the API. The value of the item "development cost" indicates the cost required to develop the API.

In the example of FIG. 4, the API1 is charged with 0 yen each time the API1 is called, and when the API1 is called 100 times or more in one month, X yen is uniformly charged. Further, the cost required when the service provider independently develops the API1 is XX yen.

Also, in the example of FIG. 4, the API2 is charged XO yen per month regardless of the number of calls. In addition, the cost required when the service provider independently develops API2 is 00 yen.

FIG. 5 is a diagram illustrating an example of the usage history storage unit. The usage history storage unit 230 includes service usage history information 231 indicating a history of the service used by the user, module usage history information 232 indicating a history of the module used by the user, and API usage history information 233 indicating a usage history of the API used by the service.

The service usage history information 231 has the service name and the number of users as information items, and both are associated with each other. The value of the item "number of users" indicates the number of users who are using the service identified by the corresponding service name.

The module usage history information 232 has the module name and the number of users as information items, and both are associated with each other. The value of the item "number of users" indicates the number of users who are using the module identified by the corresponding module name.

The API usage history information 233 has the API name and the number of calls as information items, and both are associated with each other. The value of the item "number of calls" indicates the number of times the API identified by the corresponding API name is called by the module associated with the service information. The API is called each time the module is used. Therefore, it may be said that the number of API calls is the history of the service used by the user.

Meanwhile, the API usage history information 233 may include information indicating the number of calls for each fixed period, such as the number of calls for each day or the number of calls for each month, in addition to the above-described information.

Further, in the API usage history information 233, for example, the module that calls each API may be associated with the number of calls for each module.

Figure 6:
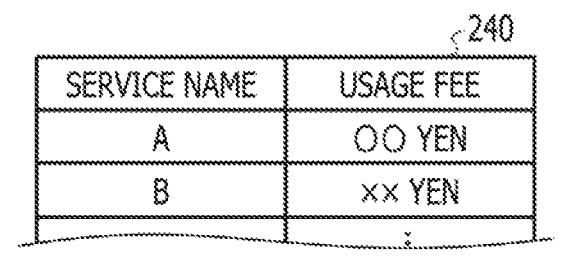

FIG. 6 is a diagram illustrating an example of the service usage fee storage unit. The service usage fee storage unit 240 may be provided to the service cost calculation device 200 in advance by the service provider. The service usage fee storage unit 240 of the present embodiment has a service name and a usage fee as information items, and both are associated with each other.

The value of the item "usage fee" indicates the fee paid to the service provider by the user who uses the service identified by the corresponding service name. In other words, the value of the item "usage fee" is a consideration paid to the service provider.

In FIG. 6, the service provider that provides the A service receives the payment of 00 yen from the user by providing the service to the user.

Next, a function of the service cost calculation unit 250 included in the service cost calculation device 200 according to the present embodiment will be described with reference to FIG. 7.

Figure 7:
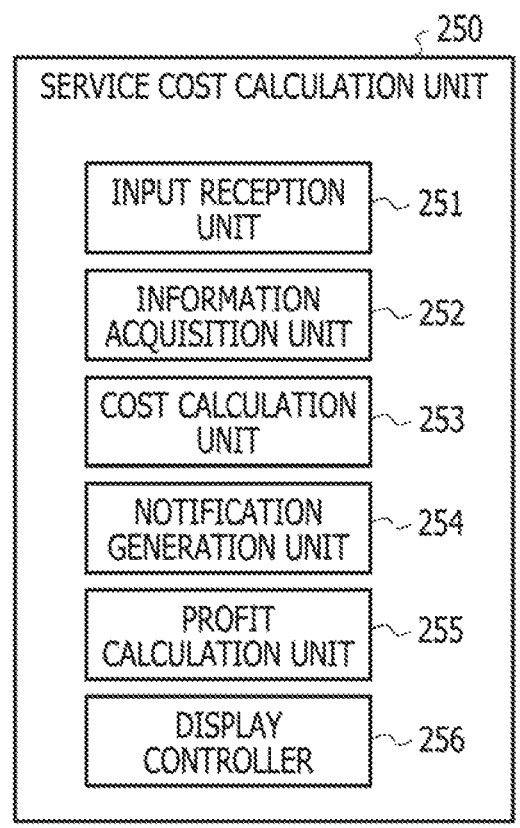
FIG. 7 is a diagram illustrating a functional configuration of the service cost calculation device.

FIG. 7 is a diagram illustrating a functional configuration of the service cost calculation device. The service cost calculation unit 250 of the present embodiment includes an input reception unit 251, an information acquisition unit 252, a cost calculation unit 253, a notification generation unit 254, a profit calculation unit 255, and a display controller 256.

The input reception unit 251 receives various inputs to the service cost calculation device 200. Specifically, the input reception unit 251 receives the input of the provider ID. The input reception unit 251 also receives selection of an API to be used from the API candidates corresponding to the module.

The information acquisition unit 252 acquires the information stored in each storage unit from the service information storage unit 210, the charge system storage unit 220, the usage history storage unit 230, and the service usage fee storage unit 240.

The cost calculation unit 253 refers to the service information storage unit 210, the charge system storage unit 220, and the usage history storage unit 230 to calculate the cost of using the API when the selected API is used. Details of the process of the cost calculation unit 253 will be described later.

The notification generation unit 254 refers to the charge system storage unit 220, compares the cost required to use the API with the development cost of the API, and when the development cost is relatively low, generates and displays a notification indicating the effect.

The profit calculation unit 255 acquires the service usage fee information by the information acquisition unit 252, and calculates the profit that the service provider obtains by providing the service based on the cost calculated by the cost calculation unit 253.

The display controller 256 presents the cost calculated by the cost calculation unit 253 and the profit calculated by the profit calculation unit 255 to the service provider. Specifically, the display controller 256 outputs the cost and the profit to the terminal device 300 of the service provider.

Meanwhile, the display controller 256 may display both the cost and the profit on the terminal device 300, or display either the cost or the profit on the terminal device 300.

Figure 8:
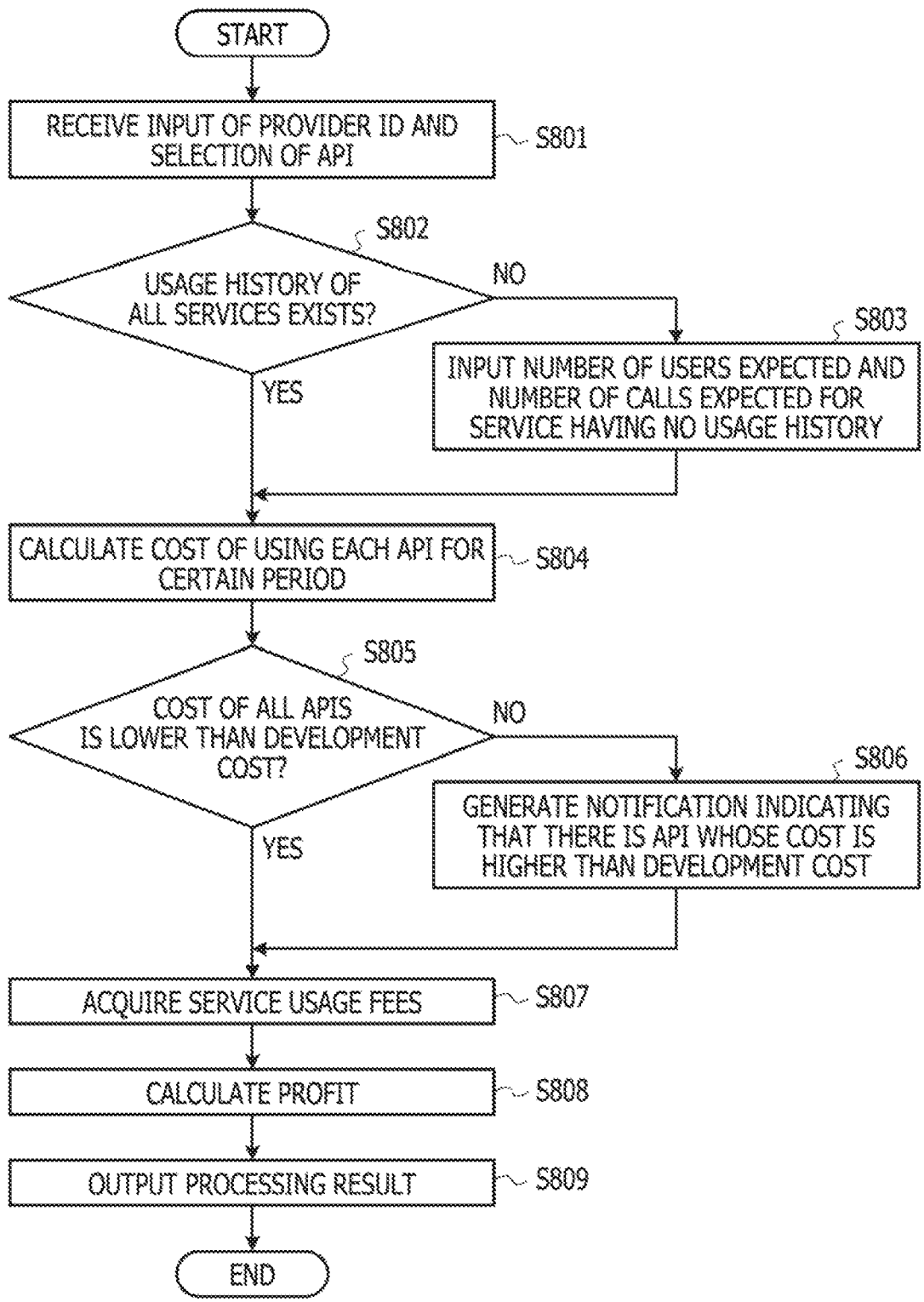
FIG. 8 is a flowchart illustrating a process of the service cost calculation device.

An operation of the service cost calculation device 200 according to the present embodiment will be described below with reference to FIG. 8. FIG. 8 is a flowchart illustrating the process of the service cost calculation device.

In the service cost calculation device 200 according to the present embodiment, the service cost calculation unit 250 uses the input reception unit 251 to receive an input of the business operator ID of a business operator for which the service profit is calculated. In addition, the input reception unit 251 receives, for each service provided by the business operator, the selection of the API used in the service (step S801).

Subsequently, the service cost calculation unit 250 determines by the information acquisition unit 252 whether the usage history information of all the services corresponding to the provider ID selected in the service information storage unit 210 exists in the usage history storage unit 230 (step S802). In the service information storage unit 210, all services associated with the selected provider ID indicate all services provided by the provider identified by the provider ID.

When it is determined, in step S802, that usage history information does not exist for all services provided by the provider, that is, when there is a service for which usage history information does not exist, the information acquisition unit 252 refers to the service information storage unit 210 to acquire the number of users expected to be used and the number of calls expected for the selected API for the corresponding service (step S803), and the process proceeds to step S80 described later.

When it is determined, in step S802, that the usage history information exists for all services provided by the provider, the service cost calculation unit 250 acquires the API usage history information and the charge system information of each selected API by the information acquisition unit 252, and calculates the cost of using each selected API for a certain period by the cost calculation unit 253 (step S804).

The calculation of the cost for using the API will be described below. Here, as an example, the API called by the A service is defined as API1, and the calculation of the cost for one month for using API1 will be described.

The information acquisition unit 252 first refers to the usage history storage unit 230 and acquires the number of calls of API1 for one month. Subsequently, the information acquisition unit 252 refers to the charge system storage unit 220 and acquires the charge system information of API1.

Subsequently, the cost calculation unit 253 calculates the cost of using the API1 for one month based on the number of calls for one month acquired by the information acquisition unit 252 and the charge system information of the API1.

Here, for example, it is assumed that the charge system of API1 is 1 yen per call, and when the number of calls is 100 or more in one month, the charge is 100 yen uniformly. In this case, when the number of API1 calls per month is 80, the cost is 80 yen.

Next, as another example, descriptions will be made on the calculation of the cost for using API1 for one month when the API to be called is API1 in both the A service and the B service.

In this case, the number of API1 calls is the sum of the number of calls by the A service and the number of calls by the B service. Here, it is assumed that the sum of the number of calls by the A service and the number of calls by the B service is 150 times. In this case, since the number of calls is 100 or more in one month, the cost of using API1 is 100 yen.

Further, as another example, descriptions will be made on the calculation of the cost for using API1 and API6 for one month when the API called by the A service is API1 and the API called by the B service is API6.

In this case, when the number of API1 calls per month is 80, the cost is 80 yen.

Further, it is assumed that the charge system of API6 is 2 yen per call and the number of calls per month is 30. In this case, the cost of API6 for one month is 60 yen.

Therefore, the cost of using API1 and API6 for one month is 140 yen, which is the sum of 80 yen and 60 yen.

From the above, when the API candidates to be called by the B service are API1 and API6, it is understood that selecting API1 lowers the cost for the service provider to use the API.

Subsequently, the service cost calculation unit 250 refers to the charge system storage unit 220 by the notification generation unit 254, and determines whether the cost is lower than the development cost in all the APIs for which the cost is calculated (step S805). In other words, the notification generation unit 254 determines whether there is an API whose cost is higher than the development cost.

When it is determined, in step S805, that there exists an API where the cost is higher than the development cost, the notification generation unit 254 generates a notification indicating the effect (step S806), and the process proceeds to step S807 described later.

When it is determined, in step S805, that the cost is lower than the development cost in all the APIs for which the cost has been calculated, the service cost calculation unit 250 uses the information acquisition unit 252 to acquire service usage fees from the service usage fee storage unit 240 for all services provided by the business operator (step S807).

Subsequently, in the service cost calculation unit 250, the profit calculation unit 255 calculates the profit of each service provided by the business operator (step S808), the display controller 256 outputs the processing result to the terminal device 300 (step S809), and the process ends.

At this time, the display controller 256 displays a graph in which figures representing all services provided by the service provider and APIs called by each service are arranged on the two axes of the number of service users and the number of API calls, and displays the profit for each service together with the figures.

Hereinafter, a display example in the terminal device 300 according to the present embodiment will be described with reference to FIGS. 9 to 13.

Figure 9:
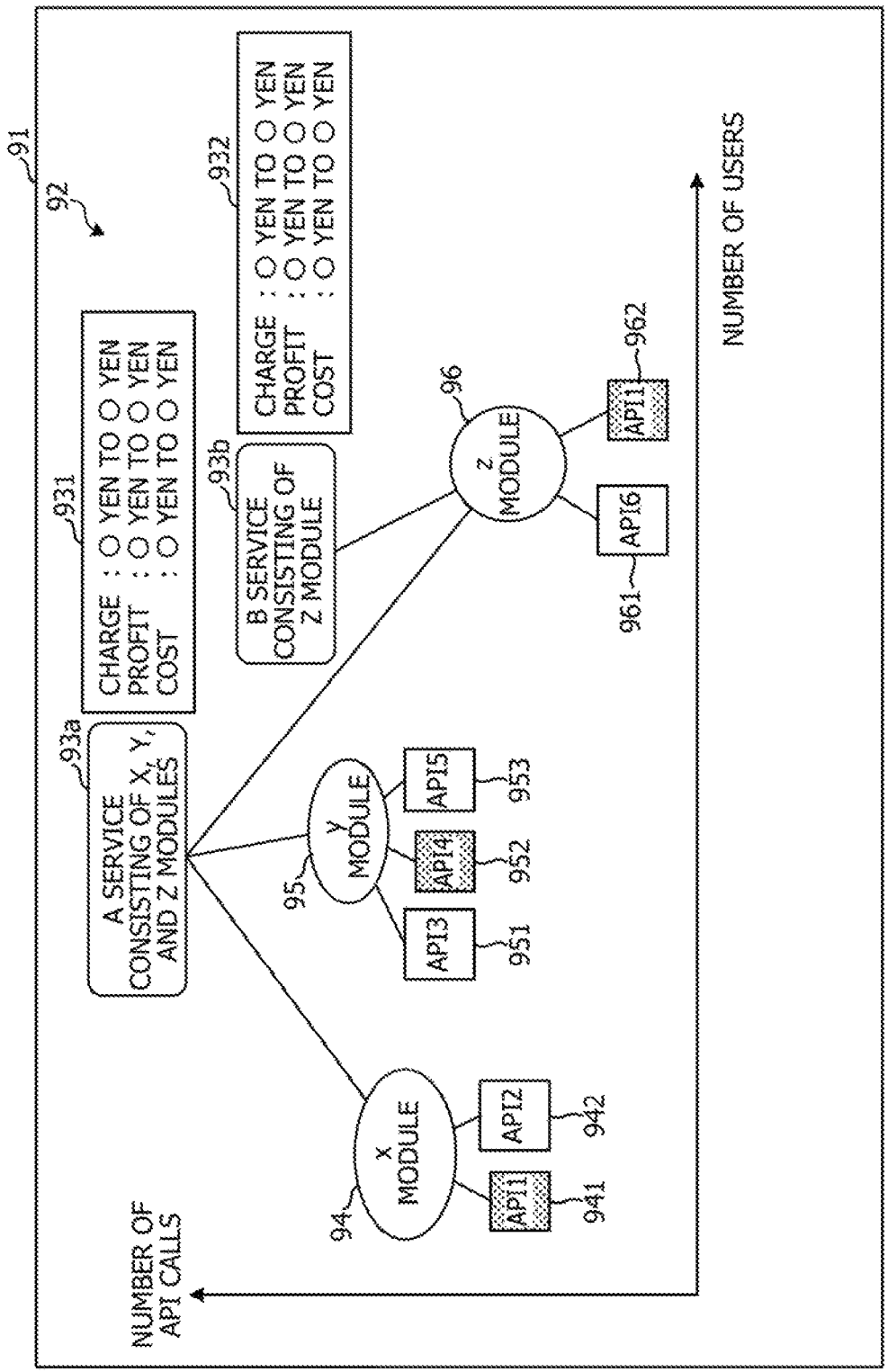
FIG. 9 is a first diagram illustrating a display example.

FIG. 9 is a first diagram illustrating a display example. A screen 91 illustrated in FIG. 9 represents an example of a screen on which the processing result by the service cost calculation unit 250 is displayed on the terminal device 300.

The example of FIG. 9 represents a case where the provider ID "01" is input in step S801 of FIG. 8. The services which are provided by the service provider and identified by the provider ID "01" are the A service and the B service. The A service includes the x module, the y module, and the z module, and the B service includes the z module (see, e.g., FIG. 3).

A graph 92 in which the horizontal axis represents the number of service users and the vertical axis represents the number of API calls is displayed on the screen 91.

In the graph 92, a graphic indicating the A service and the B service is arranged at a position based on the number of users of each service and the number of API calls made by each service.

Specifically, in the graph 92, a graphic 93a indicating the A service is arranged at a position corresponding to the number of users of the A service and the number of API calls called by the A service. Further, in the graph 92, a graphic 93b indicating the B service is arranged at a position corresponding to the number of users of the B service and the number of API calls called by the B service.

In addition, in the graph 92, a graphic indicating a module included in each service is displayed in association with each service, and a graphic indicating each API that is a candidate called by each module is displayed in association with each module.

In the graph 92, a graphic 94 indicating the x module, a graphic 95 indicating the y module, and a graphic 96 indicating the z module included in the A service are displayed in a tree shape with the graphic 93a indicating the A service as a node.

Since the module included in the B service is the z module, the graphic 96 is also associated with the graphic 93b indicating the B service.

Further, in the graph 92, a graphic indicating an API that is a candidate to be called is displayed in association with each module.

The candidate APIs called by the x module are API1 and API2, the candidate APIs called by the y module are API3, API4, and API5, and the candidate APIs called by the z module are API1 and API6 (see FIG. 3).

Therefore, in the graph 92, the graphic 941 indicating API1 and the graphic 942 indicating API2 are displayed in a tree shape with the graphic 94 indicating the x module as a node. Further, a graphic 951 indicating API3, a graphic 952 indicating API4, and a graphic 953 indicating API5 are displayed in a tree shape with the graphic 94 indicating the y module as a node. Also, a graphic 961 indicating API6 and a graphic 941 indicating API1 are displayed in a tree shape with the graphic 96 indicating the z module as a node.

Further, in the graph 92, the display modes of the graphic 941 and the graphic 942 are different, and it may be seen that API1 is selected as the API used in the x module. Similarly, for the y module, API4 is selected as the API to be used, and for the z module, API1 is selected as the API to be used.

Further, in the graph 92, the graphics representing the service and the module, respectively, are arranged at positions corresponding to the number of users of the service and the number of calls of the API to be used. Also, the graphic representing the API is arranged in a size corresponding to the number of calls.

For example, in the graph 92, a FIG. 93a is arranged at a position indicated by a sum of the number of users of the A service acquired from the service usage history information 231 of the service information storage unit 210 (horizontal axis) and the number of calls of all APIs called by the A service (vertical axis).

All APIs called by the A service are API1 and API4. Therefore, the total number of calls of all APIs called by the A service is the total number of calls of API1 and API4 in the API usage history information 233 of the usage history storage unit 230.

Further, in the graph 92, a FIG. 93b is arranged at a position indicated by a sum of the number of users of the B service acquired from the service usage history information 231 of the service information storage unit 210 and the number of calls of all APIs called by the B service.

All APIs called by the B service are API1 and API6. Therefore, the total number of calls of all APIs called by the B service is the total number of calls of API1 and API6 in the API usage history information 233 of the usage history storage unit 230.

Further, in the present embodiment, a display column 931 for displaying the usage fee, profit, and cost of the A service is displayed near the FIG. 93a indicating the A service, and a display column 932 for displaying the usage fee, profit, and cost of the B service is displayed near the graphic 93b indicating the B service.

Further, in the graph 92, a FIG. 94 is arranged at a position indicated by a sum of the number of users of the x module acquired from the module usage history information 232 of the usage history storage unit 230 (horizontal axis) and the number of API calls called by the x module (vertical axis).

The API called by the x module is API1. Therefore, the total number of API calls called by the x module is the number of API1 calls in the API usage history information 233 of the usage history storage unit 230.

The same applies to FIGS. 95 and 96. In the graph 92, the graphic 95 is arranged at a position indicated by a sum of the number of users of the y module (horizontal axis) and the number of API4 calls called by the y module (vertical axis). Further, the graphic 96 is arranged at a position indicated by a sum of the number of users of the z module (horizontal axis) and the number of API1 calls called by the z module (vertical axis).

In the present embodiment, the graphic indicating the module is displayed as a graphic having a size corresponding to the cost of the module. The cost of a module is the cost of using the API that the module calls.

Meanwhile, in the example of FIG. 9, each module calls one API, but the number of APIs called by the module is not limited to one. For example, there may be a plurality of APIs called by the module. In that case, in the present embodiment, a plurality of APIs to be actually called are selected from the API candidates called by the module.

Further, in the graph 92, the graphic indicating the API is displayed in a size corresponding to the number of calls for each API. In the graph 92, the graphic 941 is displayed as a graphic having a size corresponding to the number of API1 calls in the API usage history information 233 of the usage history storage unit 230, and the graphic 942 is displayed as a graphic having a size corresponding to the number of API2 calls in the API usage history information 233 of the usage history storage unit 230.

As described above, in the present embodiment, the service usage fee, profit, and cost are displayed for each service. Further, in the present embodiment, a graph is displayed in which a horizontal axis represents the number of users of the service and a vertical axis represents the number of API calls, and a graphic indicating a module included in the service and a graphic indicating the API called by the service are arranged. Also, the graphic indicating the module and the graphic indicating the API are displayed in sizes corresponding to the respective costs.

Therefore, in the present embodiment, it is possible to easily grasp the profit obtained by providing the service using the API.

For example, in the graph 92, the B service has a larger number of users and a smaller number of API calls than the A service. Therefore, it may be seen that the B service has lower cost and a higher profit than the A service for the provider.

Further, in the graph 91, the FIG. 94 indicating the x module is larger than the FIG. 95 indicating the y module, and has the same size as the FIG. 96 indicating the z module. From this, it may be understood that although the x module has a smaller number of users than the y module and z module, the cost calculated from the number of API calls is higher than that of the y module and z module, and a countermeasure is required.

In other words, in the graph 92, since the services, modules, and APIs indicated by the graphic arranged in the upper left have higher costs and a smaller number of users, there is a high possibility that countermeasures are required. Further, in the graph 92, the services, modules, and APIs indicated by the graphic arranged in the lower right figure have lower costs and a larger number of users, and thus are likely to contribute to profits.

As described above, according to the present embodiment, it is possible for the service provider to intuitively understand the factors that hinder the profit from the viewpoint of the number of users, API charges, and the number of calls for each service.

Further, in the present embodiment, for example, when an operation of moving the position of the graphic indicating the service on the graph 92 is performed, the cost and the profit according to the position after the movement on the graph 92 may be calculated and displayed.

For example, a case is considered where the graphic 93a is moved to the right in the graph 92. In this case, the number of service users increases. Therefore, the service cost calculation unit 250 may calculate the cost and profit by using the number of users corresponding to the position of the graphic 93a after the movement.

In the present embodiment, by moving the figure on the graph 92 in this way, it is possible to calculate the cost and profit according to the number of users after the movement. In other words, in the present embodiment, by changing the position of the graphic indicating the service to the left or right on the graph 92, the profit and cost are dynamically reflected, and the simulation result by the number of users may be visualized.

Further, in the present embodiment, when an operation of selecting a graphic indicating a module is performed on the screen 91, a list of API candidates corresponding to the selected module may be displayed.

Figure 10:
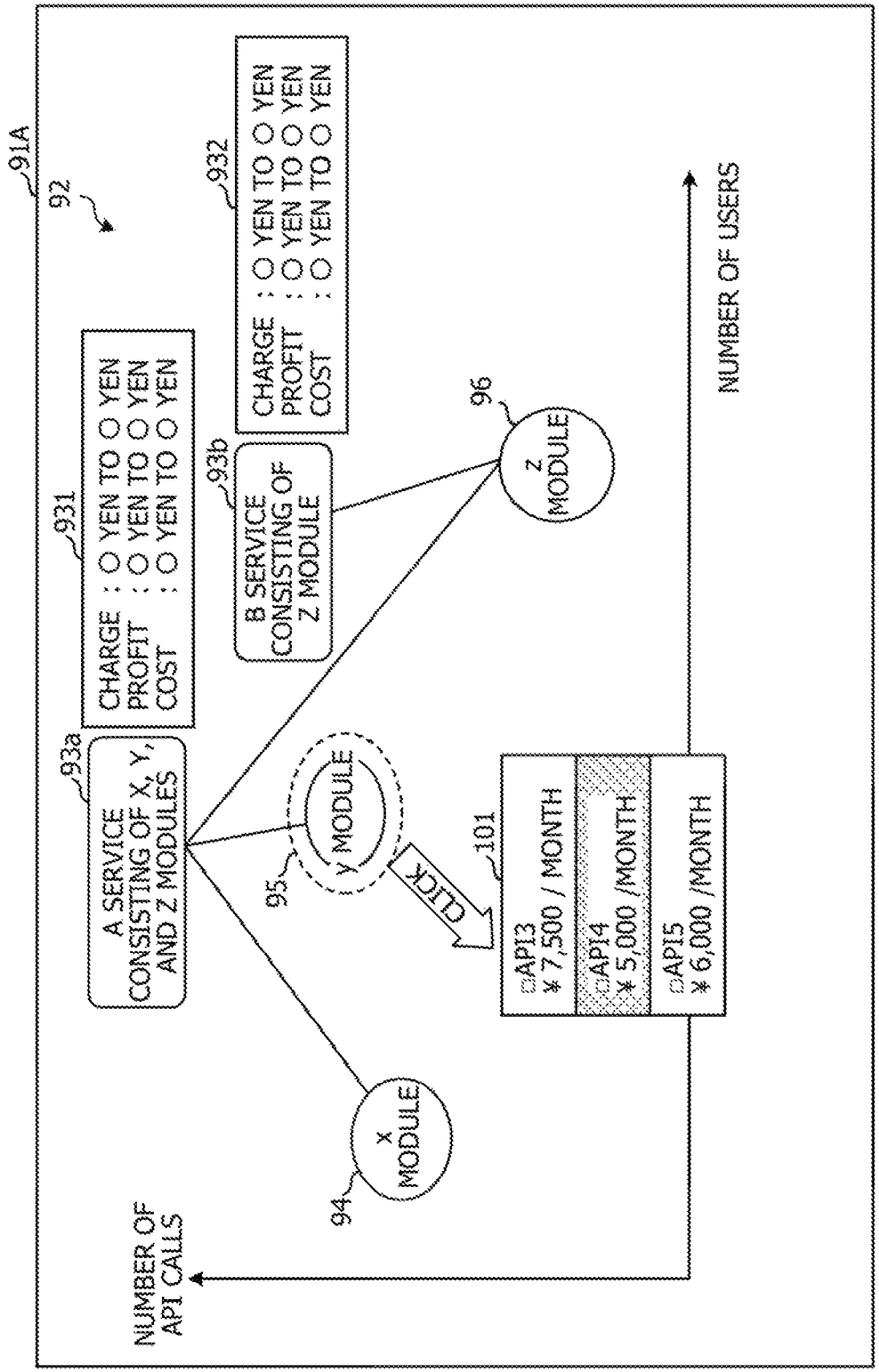
FIG. 10 is a second diagram illustrating a display example.

Next, FIG. 10 illustrates a case where the graphic 95 indicating the y module is selected in the graph 92.

FIG. 10 is a second diagram illustrating a display example. A screen 91A illustrated in FIG. 10 represents a case where the graphic 95 indicating the y module is selected.

A display column 101 associated with the graphic 95 is displayed on the screen 91A. APIs that may be called by the y module and costs of each API are displayed in the display column 101. More specifically, each API and a charge (cost) for using each API for one month are displayed in the display column 101. Further, in the display column 101, the relevant part is highlighted to indicate that the API4 is currently selected.

In the present embodiment, for example, when another API is selected in the display column 101, costs and profits when using the selected API may be calculated and displayed in the display column 931.

Further, in the present embodiment, when the API is selected in the display column 101, the charge system information of the selected API may be displayed. At this time, the charge system information of the selected API may be collected in advance and stored in the charge system storage unit 220. Further, the charge system information of the selected API may be acquired by the information acquisition unit 252 via the Internet or the like by receiving a selection of the API.

Next, FIG. 10 illustrates a case where API4 is selected in the display column 101.

Figure 11:
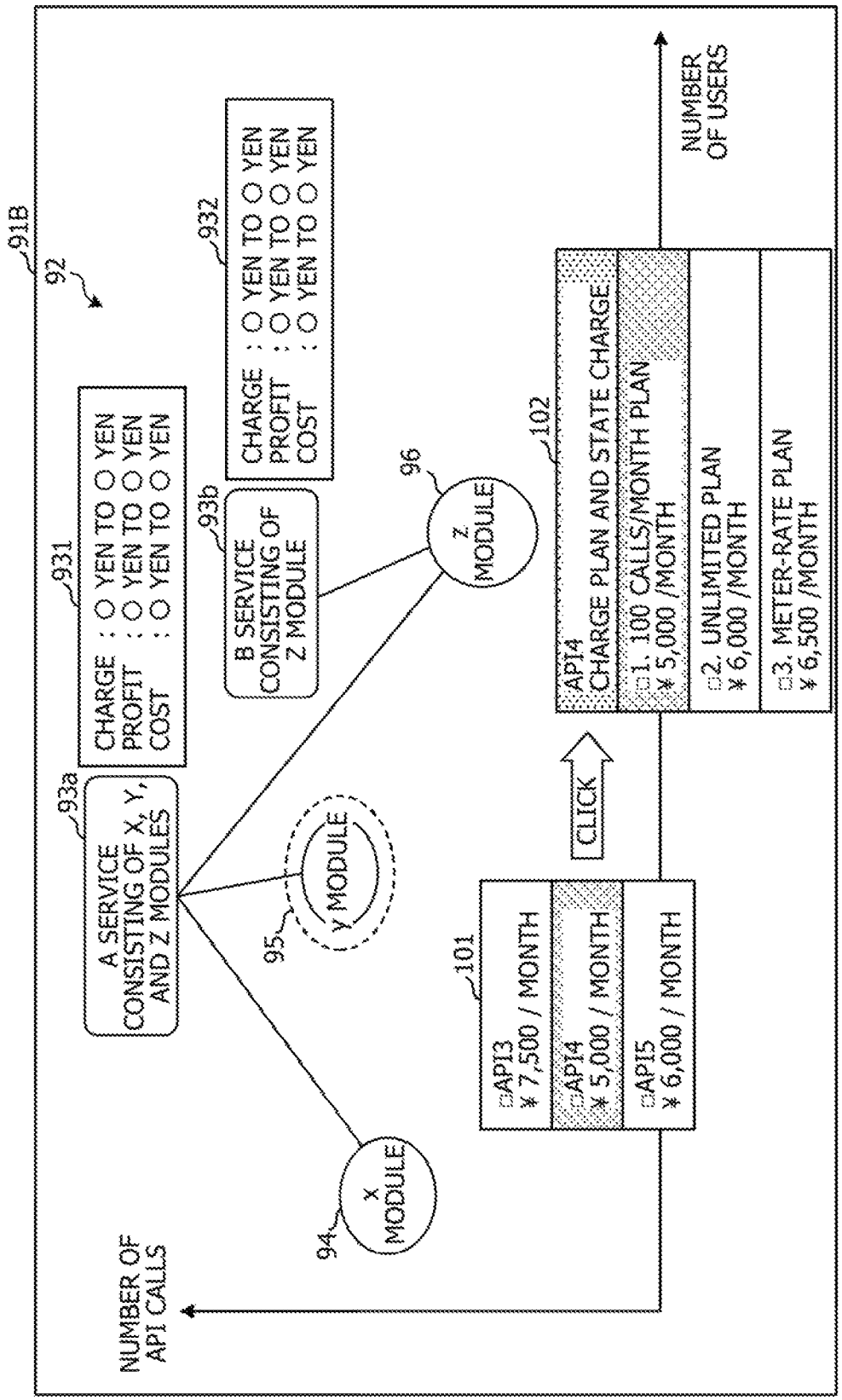
FIG. 11 is a third diagram illustrating a display example.

FIG. 11 is a third diagram illustrating a display example. A screen 91B illustrated in FIG. 11 represents a case where API4 is selected in the display column 101.

A display column 102 associated with the display column 101 is displayed on the screen 91B. The charge system information of API4 is displayed in the display column 102.

In the example of FIG. 11, it may be seen that API4 charge system includes four charge plans. Further, in the example of FIG. 11, it may be seen that API4 is used as the first charge plan (a charge system of 5000 yen per month when the number of calls is up to 100).

In the present embodiment, for example, when another charge plan is selected in the display column 102, costs and profits when API4 is used in the selected charge plan may be calculated and displayed in the display column 931.

Figure 12:
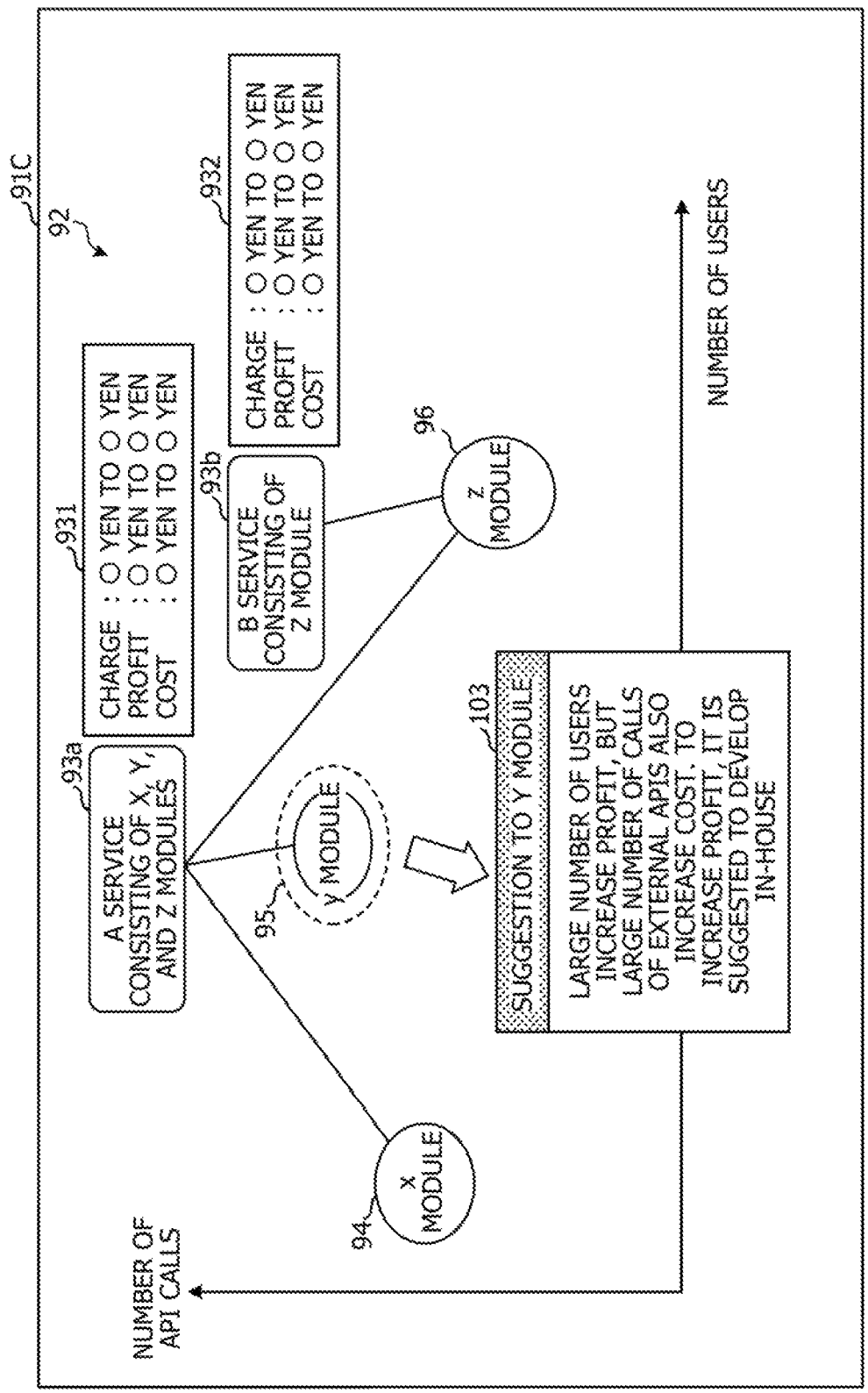
FIG. 12 is a fourth diagram illustrating a display example.

Further, in the present embodiment, when the cost of the API is higher than the development cost, the notification indicating the effect is displayed. In FIG. 12 below, descriptions will be made on a case where the cost of API4 used in the y module for one month is higher than the development cost.

FIG. 12 is a fourth diagram illustrating a display example. A notification 103 generated by the notification generation unit 254 is displayed in association with the graphic 95 indicating the y module on a screen 91C illustrated in FIG. 12.

The notification 103 is displayed as a suggestion for the y module. In addition, the notification 103 is a message indicating that the development of API4 is recommended because the cost of API4 used in the y module is higher than the development cost when the service provider develops API4 independently.

In the present embodiment, it is possible to present a method for reducing the cost to the service provider in this way.

As described above, according to the present embodiment, the usage status and cost of the modules and APIs included in the service are visualized.

Further, in the present embodiment, the cost is calculated by referring to the charge system information of the API used for all services provided by the service provider, rather than for each service. Therefore, according to the present embodiment, it is not necessary to check the usage status of the API for each service.

Meanwhile, in the display example of the present embodiment, the service usage fee, the cost, and the profit are assumed to be displayed in each of the display columns 931 and 932, but the present disclosure is not limited thereto. In the display columns 931 and 932, at least either the cost or the profit of the service may be displayed, and the usage fee of the service may not be displayed.

According to an aspect of the embodiments, it is possible to easily grasp the profit obtained by providing a service using an API.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
   a memory; and
   a processor coupled to the memory and the processor configured to:
      acquire charge system information indicating a charge system of each application programming interface (API) called by a service;
      acquire usage history information indicating a usage history of the service by a user;
      calculate a cost for each API based on a number of calls of each API, which is included in the usage history information, and a charge system of each API; and
      arrange and display a graphic indicating each of the service, an API called by the service, and a candidate API called by the service on a two-axis indicating a number of users of the service and a number of calls of the API.

2. The information processing apparatus according to claim 1, wherein
   the processor is further configured to
   calculate a cost required for the service based on the cost for each API and a number of users of the service.

3. The information processing apparatus according to claim 1,
   wherein
   the processor is further configured to arrange and display the graphic indicating each of the service, each API called by the service, and the candidate API called by the service on a two-axis indicating the number of users of the service and the number of calls of the API.

4. The information processing apparatus according to claim 3, wherein
   the processor is further configured to:
   receive an operation of selecting a graphic representing the service; and
   display a list of APIs that are candidates to be called by the service and a cost for each API.

5. The information processing apparatus according to claim 4, wherein
   the processor is further configured to:
   receive an operation of selecting an API from the list of APIs; and
   display the charge system information of the selected API.

6. The information processing apparatus according to claim 1, wherein
   the graphic is displayed in a size corresponding to the cost.

7. The information processing apparatus according to claim 6, wherein
   the processor is further configured to
   generate and display a notification urging a development of a first API when it is determined that the first API requires a cost that is higher than a development cost of the first API.

8. A service cost calculation method, comprising:
   acquiring, by a computer, charge system information indicating a charge system of each application programming interface (API) called by a service;
   acquiring usage history information indicating a usage history of the service by a user;
   calculating a cost for each API based on a number of calls of each API, which is included in the usage history information, and a charge system of each API; and
   arranging and displaying a graphic indicating each of the service, an API called by the service, and a candidate API called by the service on a two-axis indicating a number of users of the service and a number of calls of the API.

9. A non-transitory computer-readable recording medium having stored therein a program that causes a computer to execute a process, the process comprising:
   acquiring charge system information indicating a charge system of each application programming interface (API) called by a service;
   acquiring usage history information indicating a usage history of the service by a user;
   calculating a cost for each API based on a number of calls of each API, which is included in the usage history information, and a charge system of each API; and
   arranging and displaying a graphic indicating each of the service, an API called by the service, and a candidate API called by the service on a two-axis indicating a number of users of the service and a number of calls of the API.

* * * * *